S. J. CLULEE.
CONSTRUCTION FOR EYEGLASSES.
APPLICATION FILED JUNE 1, 1918.
1,366,768.
Patented Jan. 25, 1921.
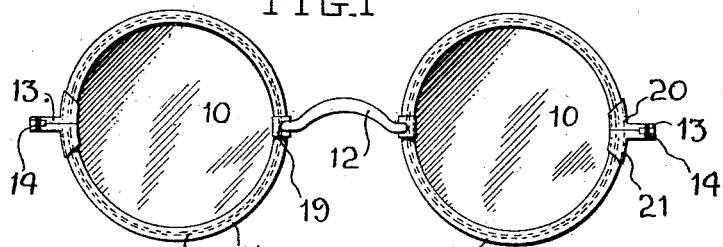
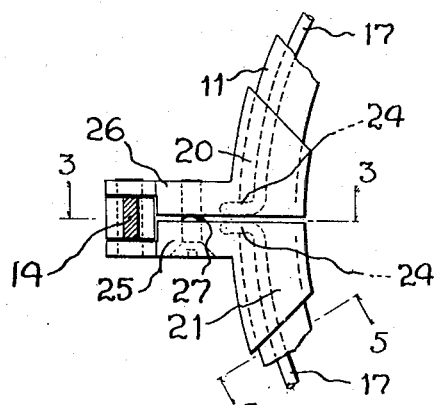
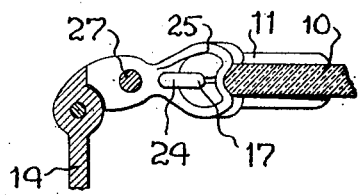
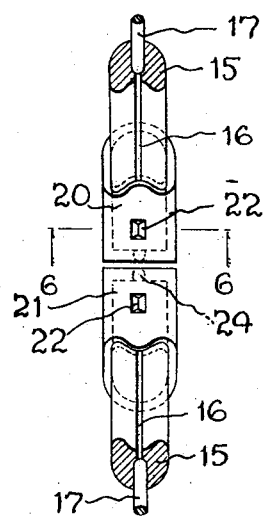
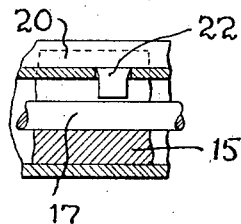
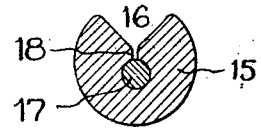
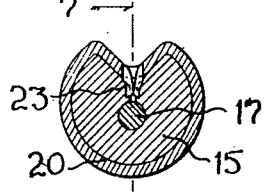

UNITED STATES PATENT OFFICE.

STEPHEN J. CLULEE, OF ATTLEBORO, MASSACHUSETTS.

CONSTRUCTION FOR EYEGLASSES.

1,366,768.   Specification of Letters Patent.   Patented Jan. 25, 1921.

Application filed June 1, 1918. Serial No. 237,720.

*To all whom it may concern:*

Be it known that I, STEPHEN J. CLULEE, a citizen of the United States, and a resident of Attleboro, in the county of Bristol and State of Massachusetts, have invented an Improvement in Construction for Eyeglasses, of which the following is a specification.

This invention relates to eyeglass construction, and more particularly to the construction of eyeglasses comprising a non-metallic rim member. One of the objects thereof is to provide a strong practical eyeglass construction of attractive appearance and inexpensive in manufacture. Another object is to provide simple and yet secure means for connecting an attachment such as an end member to an eyeglass rim. Other objects will be in part obvious and in part pointed out hereinafter.

The invention accordingly consists in the features of construction, combinations of elements and arrangements of parts which will be exemplified in the structure hereinafter described and the scope of the application of which will be indicated in the following claims.

In the accompanying drawing in which is shown one of various possible embodiments of this invention, Figure 1 is a rear elevation;

Fig. 2 is a similar view of a portion of Fig. 1 showing the parts on a larger scale;

Fig. 3 is a sectional view taken along the line 3—3 of Fig. 2;

Fig. 4 is an inside edge view of the parts shown in Fig. 2;

Fig. 5 is a sectional view of a rim taken on the line 5—5 of Fig. 2;

Fig. 6 is a sectional view along the line 6—6 of Fig. 4;

Fig. 7 is a sectional view along the line 7—7 of Fig. 6.

Similar reference characters refer to similar parts throughout the several views of the drawing.

Referring now to Fig. 1 of the accompanying drawing, there is shown a pair of eyeglasses comprising the lenses 10 mounted in rims 11 connected by the bridge 12. The outer portions of these rims are provided with the attachments 13 to which the temple bars 14 are pivoted in the usual way. It may be noted that although the device here shown forms what is sometimes referred to as "spectacles", nevertheless the term "eyeglass" is broadly used throughout to comprehend any device for holding lenses in front of the eye. It is also to be noted that the terms in the nature of "outward" indicate the direction away from the center of the lenses, and that the side of the glasses toward the eye is referred to as the "rear".

Considering now more particularly the construction of the rim members, it is to be noted that the main rim member 15 is formed of non-metallic material, preferably "celluloid", the latter term being broadly used to denote any material of similar properties. This rim member is grooved on its inner side as at 16 to embrace the edge of the corresponding lens 10 and this groove is extended outwardly to receive a metal wire or strengthening member 17. The celluloid, after the wire 17 is inserted at the bottom of the recess or groove, is preferably forced into such position as to lock the wire in place, as indicated at 18 in Fig. 5 of the drawings.

With the rim members formed as above, each passes through a suitable sleeve 19 at the adjacent end of the bridge 12 and locks into engagement therewith as by means hereinafter described in detail with regard to the terminal sleeves 20 and 21 of the attachment 13.

Referring more particularly to Fig. 3 of the drawing, it is to be noted that the sleeve 21 is fitted tightly about the adjacent end of the composite rim and thereafter its inner surface depressed into the groove 16, thus tightly clamping the sleeve in position. In order, however, more securely to interlock the sleeve with the rim, a short V-shaped depression is made in the already depressed surface of the sleeve as at 22, this depression carrying the metal downwardly into the celluloid as shown at 23 in Fig. 6 of the drawing. The depression thus formed bites into and interlocks with the celluloid and does away with any chance of separation of the parts thus connected.

The end of the metallic wire 17 is abruptly turned outwardly at 24, as shown in Fig. 3 of the drawing, and rests in suitable recesses in the sleeve member 21 and the rim member 15 so as to lie flush with the end surface of the rim, as indicated in dotted lines in Fig. 2 of the drawing. In this manner, the end of the wire is securely anchored and the parts held even more firmly in assembled relation.

The sleeve members 20 and 21 are provided with mating arms 25 and 26 releasably secured together as by the screw 27 whereby the rim may be opened to permit the insertion or removal of a lens, and thereafter securely clamped in position.

By the above construction, there is provided a rim which while possessing the attractive appearance of celluloid is nevertheless given a high degree of strength and the various attachments, although of simple and inexpensive construction, are nevertheless rigidly anchored in assembled relation. Furthermore the lenses may be readily changed and the entire device is suited to withstand considerable variations in temperature and dampness without being injuriously affected thereby.

As various possible embodiments might be made of the above invention and as various changes might be made in the embodiment above set forth, it is to be understood that all matter herein set forth or shown in the accompanying drawings is to be interpreted as illustrative and not in a limiting sense.

I claim as my invention:

1. In eyeglass construction, in combination, a composite rim comprising a non-metallic rim member provided with a groove extending substantially throughout its length, and a metallic rim member in said groove extending substantially throughout its length, said non-metallic member extending over said metallic member at the front and outer edges of the glasses, whereby said metallic member is invisible from the front and edges of the glasses.

2. In eyeglass construction, in combination, a composite rim comprising a non-metallic rim member provided with a groove extending substantially throughout its length, and a metallic rim member in said groove extending substantially throughout its length, the inner walls of said groove and the outer surfaces of said metallic member contacting therewith being shaped to lock said metallic member against relative movement in the direction of the open side of the groove.

3. In eyeglass construction, in combination, a composite rim comprising a non-metallic rim member provided with a groove extending substantially throughout its length, and a metallic rim member in said groove extending substantially throughout its length, said non-metallic member embracing said metallic member to interlock therewith substantially throughout its length, and extending over said metallic member at the front and outer edges of the glasses whereby said metallic member is invisible from the front and edges of the glasses.

4. In eyeglass construction, in combination, a composite rim comprising a non-metallic rim member provided with a groove the opening to which is narrower than the maximum width thereof, a metallic member seated in said groove substantially throughout the length of the rim, said non-metallic member being shaped to provide a recess around its inner surface, and a lens having its edge seated in said recess and resting against said non-metallic member.

5. In eyeglass construction, in combination, a non-metallic rim member, a pair of end members provided with sleeves into which said non-metallic member fits, a metallic member extending throughout the rim and embedded in said non-metallic member to interlock therewith, and means adapted to detachably secure together said end members.

6. In eyeglass construction, in combination, a composite rim comprising a metallic member and a non-metallic member lying longitudinally thereof and embracing the same to conceal it from view in a direction edgewise of the glasses, said rim having a pair of ends and a pair of end members respectively adjacent said ends and having the ends of said metallic member interlocked therewith.

7. In eyeglass construction, in combination, a composite rim comprising a non-metallic rim member provided with a groove extending substantially throughout its length, a metallic rim member in said groove extending substantially throughout its length, and a lens within said rim, said metallic member being provided with parts extending outwardly away from said lens to anchor it against longitudinal movement relative to said non-metallic member.

8. In eyeglass construction, in combination, a composite rim comprising a non-metallic rim member provided with a groove on its inner side extending substantially throughout its length, a metallic rim member seated at the bottom of said groove and having said non-metallic member extend inwardly on each side thereof to interlock therewith, a pair of end members provided with sleeves into which the ends of said non-metallic members fit, and means adapted to detachably secure said end members together.

9. In eyeglass construction, in combination, a composite rim comprising a non-metallic rim member provided with a groove extending substantially throughout its length, and a metallic rim member in said groove extending substantially throughout its length, said non-metallic member embracing said metallic member to interlock therewith substantially throughout its length, and said metallic member having parts extending outwardly to hold it against relative movement.

10. In eyeglass construction, in combination, a non-metallic rim member provided with a groove in its inner surface, and a tubular member through which said first member passes and having a portion depressed to fit said groove, and a portion further depressed to extend into and interlock with said non-metallic member.

11. In eyeglass construction, in combination, a non-metallic rim member provided with a groove in its inner surface, and a tubular member through which said first member passes and having a portion depressed to fit said groove and a portion further depressed to extend into and interlock with said non-metallic member, said last depressed portion being of wedge shape with the edge of the wedge lying in the direction of the length of the rim member.

12. In eyeglass construction, in combination, a composite rim comprising a metallic rim member and a non-metallic rim member in which said metallic member is embedded to interlock therewith throughout its length and by which it is covered at its front, rear and outer edges, a pair of metal parts respectively connected with the ends of said metallic rim member, and means adapted detachably to connect said parts one with the other whereby the ends of said composite rim are secured together about the lens.

13. A pair of eyeglasses comprising glass holding frame sections for holding the glasses, said glass holding frame section made of molded material shaped to receive the glasses and shape retaining pieces of different material from the material of said glass holding frame sections and permanently embedded therein, holding pieces connected with said glass holding frame sections and means for connecting said holding pieces together to hold the glass holding frame sections in their glass retaining position.

14. A pair of eyeglasses comprising glass holding frame sections for holding the glasses, each glass holding frame section made of molded material shaped to receive the glass and having abutting ends, and a shape retaining piece of different material from the material of said glass holding frame sections and embedded therein, holding pieces connected with said abutting ends and means for connecting said holding pieces together to hold the glass holding frame section in its glass retaining position, the ends of said shape retaining piece being connected with said holding pieces.

15. In eyeglass construction, in combination, a composite rim comprising a metallic rim member and a non-metallic rim member having an outwardly extending groove in which said metallic member rests and by which it is covered at the front and outer edge, end-securing means at each end of said composite rim comprising a pair of relatively detachable parts to which the ends of said metallic member are respectively connected, and a pair of parts respectively extending into ends of said non-metallic member in a substantially radial direction to anchor said ends against longitudinal movement relative to the adjacent metallic parts.

16. In eyeglass construction, in combination, a composite rim comprising a metallic rim member and a non-metallic rim member embracing the same and covering it at its front and outer edges, a pair of end members respectively connected with the ends of said metallic rim member and provided with means positively securing them to the ends of said non-metallic member, and means adapted detachably to secure said end members one to another and hold the rim in position about the lens.

In testimony whereof I have signed my name to this specification this twenty-fifth day of May 1918.

STEPHEN J. CLULEE.